United States Patent [19]

Bastian

[11] Patent Number: 5,541,808

[45] Date of Patent: Jul. 30, 1996

[54] SWITCHGEAR INCORPORATING AN ACTIVE FILTER

[75] Inventor: Robert J. Bastian, Madison, Conn.

[73] Assignee: General Electric Company, New York, N.Y.

[21] Appl. No.: 349,595

[22] Filed: Dec. 5, 1994

[51] Int. Cl.⁶ .............................. H02B 1/20; H02B 11/12
[52] U.S. Cl. .................. 361/605; 361/611; 307/105; 307/126; 323/205; 323/220
[58] Field of Search ........................ 361/605, 622, 361/608, 609, 611, 615, 624, 788, 790, 792, 793–794, 802, 824; 307/105, 108–109, 125–126; 323/205, 209, 220

[56] References Cited

U.S. PATENT DOCUMENTS

| | | | |
|---|---|---|---|
| 3,130,353 | 4/1964 | Mount | 361/611 |
| 3,364,394 | 1/1968 | Metz | 361/611 |
| 3,967,165 | 6/1976 | Olashaw et al. | 361/622 |
| 4,205,207 | 5/1980 | Clausing | 200/50 |
| 5,162,983 | 11/1992 | Kumagai | 363/39 |

*Primary Examiner*—Jeffrey A. Gaffin
*Assistant Examiner*—Michael Sherry
*Attorney, Agent, or Firm*—Richard A. Menelly

[57] ABSTRACT

An active filter device is provided for incorporation into a switchgear lineup. The switchgear lineup has a plurality of electrical sections including a main circuit breaker section and a load circuit breaker section spaced from the main circuit breaker section. The active filter device is applied as an integral part of the power distribution switchgear equipment, positioned between the main circuit breaker section and a load circuit breaker section. From a single location, power quality is improved for the aggregate of all loads connected to the switchgear and the upstream source. The power quality improvement may include harmonic current attenuation, harmonic voltage attenuation, load balancing, high speed power factor correction, and reduced magnitude voltage sags.

17 Claims, 3 Drawing Sheets

SWITCHGEAR INCORPORATING AN ACTIVE FILTER

BACKGROUND OF THE INVENTION

Switchgear is a general term referring to switching and interrupting devices and their combination with associated control, metering, protective and regulating devices, and also assemblies of these devices with associated interconnections, accessories, enclosures and supporting structures used primarily in conjunction with the generation, transmission, distribution and conversion of electric power. An integrated assembly of these devices within a metal enclosure is commonly referred to as switchgear. Larger versions of switchgear may be referred to as switchgear or switchboard, and typically consist of a series metal enclosed sections, each providing a distinct function or set of functions, which are linked together in a horizontal manner to form one continuous piece of equipment called a lineup. Smaller versions of switchgear may be referred to as panelboards, power panels, lighting panels, or load centers, and differ in that they are smaller in size and usually linked together in a vertical manner to form one continuous piece of equipment.

Often, power regulating devices are not integrated within the switchgear equipment. There are a wide variety of regulating devices that have been manufactured as stand alone equipment, such as tapped isolation transformers, autotransformers, inductive voltage regulators, capacitors, tuned passive filters and static power converters. Active filter technology such as that described in U.S. patent application Ser. No. 08/315,473 dated Sep. 30, 1994 titled "Active Filter Control" is relatively new and provides enhancements to power quality not found in prior regulating devices. Active filter technology does not draw harmonic current from the source as does the previous static power converters, and does not have the design, performance and physical volume difficulties associated with tuned passive filters. Active filter technology provides higher speed voltage regulation than prior technology, provides faster control of power factor than prior technology, provides active correction of voltage imbalances, and suppresses parallel resonant tank circuits within the power distribution system.

Applying active filter technology to switchgear allows one active filter device to serve multiple loads. Making it an integral part of the switchgear equipment also simplifies installation. The need to run long power, instrumentation, and control cables to a remote location where a stand alone active filter device would be located is eliminated. Associated conduit and/or cable trays and mechanical bracing devices are eliminated. Accordingly, it would be highly desirable to have an active filter device which serves multiple loads from a single location within power distribution switchgear.

Another problem with a stand alone active filter is that the filter requires it's own incoming power protective device in addition to a protective device on the upstream branch feeder. Also, a stand alone active filter may include a dedicated network gateway which provides it's own network communication protocol rather than utilizing the switchgear network gateway which provides a common network communication protocol used by components within the switchgear. A stand alone active filter thus requires duplicative components thereby increasing manufacturing costs and decreasing overall reliability and efficiency. Accordingly, it will be appreciated that it would be highly desirable to have an active filter device that does not require duplicative components and can be used in a switchgear lineup.

SUMMARY OF THE INVENTION

The present invention is directed to overcoming one or more of the problems set forth above. Briefly summarized, according to one aspect of the invention, active filter technology for incorporation into electrical equipment known as a switchgear lineup, commonly referred to as switchgear or switchboard, wherein the switchgear lineup has a plurality of electrical sections including a main circuit breaker section and a load circuit breaker section. An enclosure having top, front and rear portions and being positioned between the main circuit breaker section and a load circuit breaker section, contains an active filter device. Within the active filter device enclosure is positioned a dedicated protective device capable of short circuit interruption ratings equal to the remainder of the switchgear lineup. A front door provides access to the front portion of the active filter enclosure and an interlock keeps it closed until the active filter protective device is de-energized.

According to another aspect of the invention represented by switchgear commonly referred to as panelboard, power panel, lighting panel or load center, an electrical equipment enclosure houses switchgear that has a plurality of electrical sections. The electrical equipment enclosure includes a first compartment located near the top portion of the enclosure for housing a main circuit breaker, a second compartment positioned at a lower elevation than the first compartment for housing load circuit breakers, and a third compartment connected electrically between the first and second compartments for housing an active filter device. Included in the active filter compartment is a dedicated protective device capable of short circuit interruption ratings equal to the remainder of the switchgear.

Active filter technology is applied as an integral part of switchgear equipment. From a single location, power quality is improved for the aggregate of all loads connected to the switchgear and the upstream source. The power quality improvement may include harmonic current attenuation, harmonic voltage attenuation, load balancing, high speed power factor correction, and reduced magnitude voltage sags.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
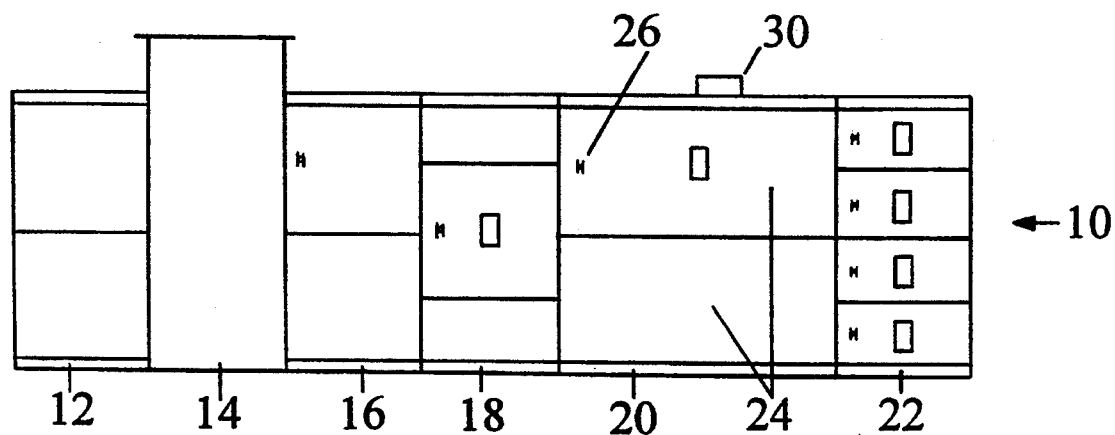
FIG. 1 is a diagrammatic perspective view of a preferred embodiment of a switchgear lineup according to the present invention with an integrated active filter section.
Figure 2:
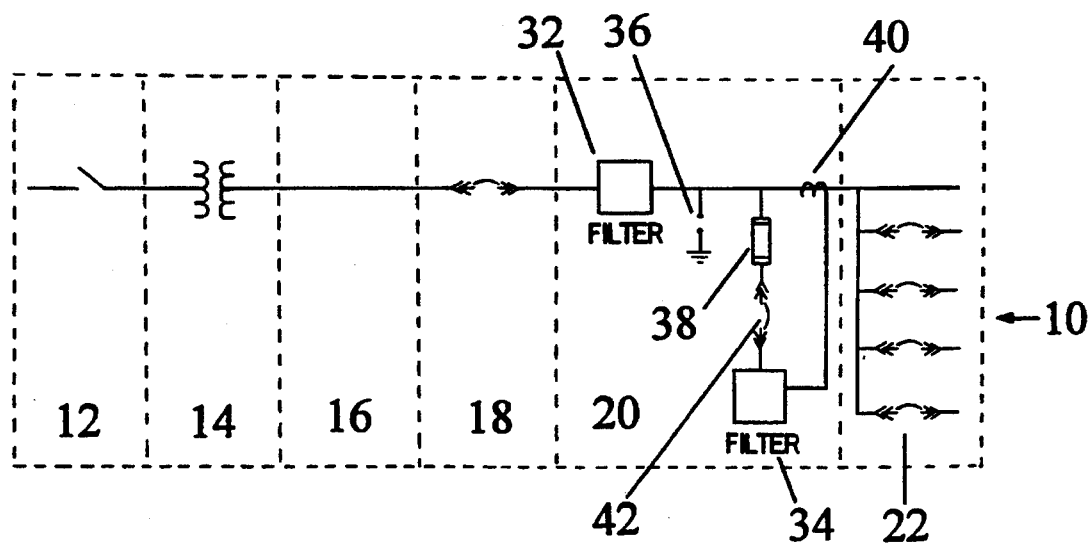
FIG. 2 is a schematic one-line diagram of the switchgear of FIG. 1 illustrating the relationship of the active filter section to other electrical sections of the switchgear.

A switchgear lineup consists of a series of electrical sections, each performing a separate function. In practice, the sections used will vary based on the demands of a given application. The example depicted in FIGS. 1 and 2 show a switchgear lineup 12 beginning with a primary section 12 that contains a power disconnect means. The primary section 12 is followed by a distribution transformer section 14 containing a distribution transformer that is used change voltage levels. The next section is a transition section 16 used to match the power connections from the secondary of the distribution transformer to the remaining sections of the switchgear lineup 10. Next, a main circuit breaker section 18 provides a protection and disconnect means between the distribution transformer section 14 and the aggregate downstream connected loads. An active filter section 20 is inserted between the main circuit breaker section 18 and the load circuit breaker section 22. In this location, the active filter section 20 provides corrective capability for all downstream loads. Although the active filter could provide this corrective function from other locations within the switchgear 10, power, instrumentation and communication connections are simplest at this location.

Access to components within the active filter section 20 of the switchgear lineup 10 is from the front through a front door 24. The front door 24 may be a single door or may be double doors and is provided with an interlock latch 26 to prevent inadvertent access to the active filter components. A lifting hoist 30 is provided to assist inserting and removing components within the active filter section 20.

The active filter section 20 consists of a series active filter element 32 or a parallel active filter element 34 either one of which, or both, may be present in an active filter section. The series element 32 is useful for voltage correction by driving a current through a series connected impedance component and the parallel element 34 is useful for injecting corrective current directly into the main power distribution lines. The series element 32 is connected upstream of the parallel element 34 on the main power distribution lines. FIGS. 1 and 2 show this by positioning the series element 32 to the left of the parallel element 34. As described in the aforementioned U.S. patent application entitled "Active Filter Control", the active filter circuit includes a first transform means for transforming a first set of signals, each signal thereof representing load current in a respective one of the main power distribution lines, into a second set of signals which includes active and reactive components of current in the main power distribution lines. The active filter also includes a filter means for receiving the active and reactive components for removing therefrom components at the fundamental frequency to provide harmonic active and reactive components. Second transform means are included within the active filter for receiving the harmonic active and reactive components and a signal representing neutral line current for performing a reverse transform operation thereon so as to provide a set of harmonic command signals, said command signals being collectively disposed to drive the device to generate line harmonic and neutral unbalance compensating currents for application to the corresponding main power distribution lines.

Figure 3:
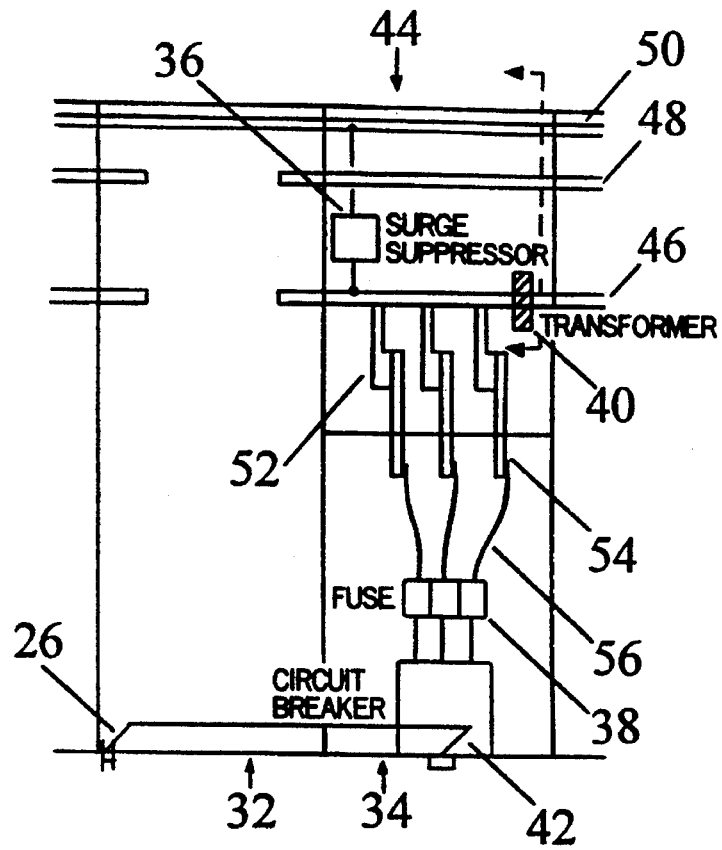
FIG. 3 is a top view of the active filter section of the switchgear of FIG. 2.

FIG. 3 illustrates components required to adapt the active filter section 20 to the switchgear lineup 10. As illustrated, the compartment to house a series active filter element is shown on the left hand portion of FIG. 3 and the compartment to house a parallel active filter element is shown on the right hand portion of FIG. 3. A common power connection is shown serving both the series element 32 and parallel element 34. The required circuit protection is achieved by installing within the front portion of the active filter device 20 a fuse 38 and/or circuit breaker 42 with short circuit interrupting ratings equal to the remainder of the switchgear. Should separate power connections be used to supply the series element 32 and parallel element 34, dedicated protective devices would be required for each power connection. Where circuit breaker 42 is used, it is connected to the front door interlock latch 26 to assure that access to the interior of the active filter section 20 is restricted until the circuit breaker 42 is de-energized.

A bus compartment 44 is formed in the rear portion of the active filter section 20. The bus compartment 44 continues along the length of the main and load circuit breaker sections 18, 22. Within the bus compartment 44 are three main phase buses 46, a neutral bus 48 and a ground bus 50, each running horizontally through the bus compartment 44. Attached to each of the main phase buses 46 is a riser bus 52 running vertically up the bus compartment 44. At the top of the riser buses 52 are connected primary stabs 54 that protrude into the back of the parallel active filter element compartment. Cable connections 56 for each phase are made from the primary stabs 54 to the fuses 38 and/or circuit breaker 42.

The present application of active filter technology represents a simplification of the number of components needed to adapt it to a power distribution system. Current transformers 40 required for active filter control are placed on each main phase bus 46. Their location between the active filter power connections 56 and the downstream loads 22 is necessary to determine the amount of current correction required for the aggregate of all downstream loads using only one set of current transformers. This location eliminates the need for current transformers at multiple locations and a summing circuit to determine the aggregate value of current transformer inputs.

The output of the active filter equipment may use surge suppressors 36 to afford protection to external devices from surges generated within it. Switchgear may contain surge suppressors to provide protection from upstream surges, or from transients generated by internal and/or downstream switching events. The active filter needs and switchgear needs are combined into one set of suitably rated surge suppressors 36 located in the bus compartment 44.

Figure 4:
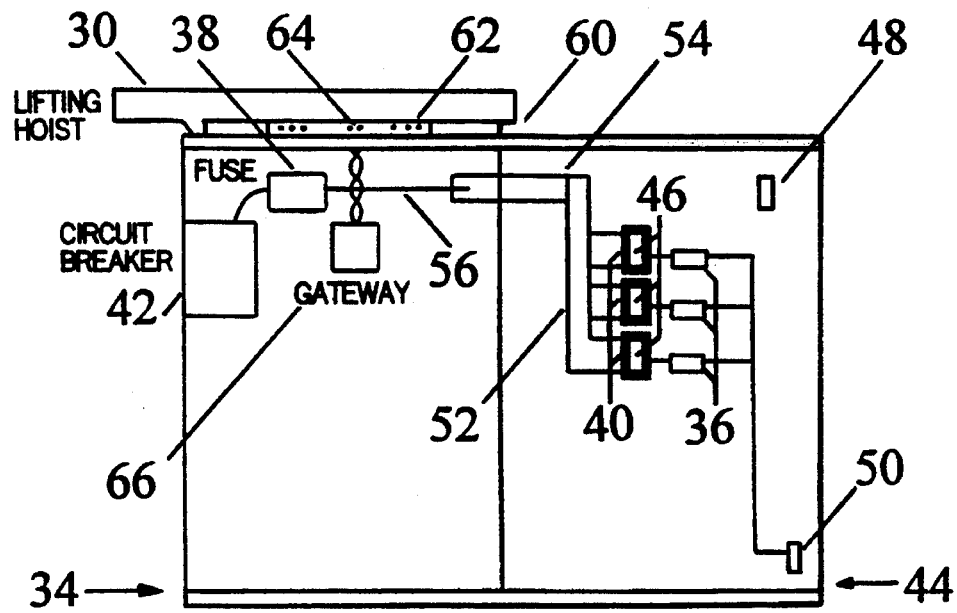
FIG. 4 is a sectional view taken along line IV—IV of FIG. 3.

Referring now to FIG. 4, the lifting hoist 30 rides on rails 60 extending along the top of the main circuit breaker section 18, active filter section 20 and load circuit breaker section 22. This allows one hoist to be used for several switchgear sections. The rails 60 straddle the sides of a cable tray 62 so that the hoist 30 rides above the cable tray 62.

The cable tray 62 extends between switchgear breaker sections; that is, the cable tray 62 runs along the top portion of the active filter section 20 between the main circuit breaker section 18 and the load circuit breaker section 22. Cables 64 for instrumentation and/or communication between switchgear sections are laid in the cable tray 62. Active filter equipment is presently available with output for external communications. A dedicated communications cable can be run up through the cable tray 62 to a remote device such as a display. To effectively integrate with communication signals from other components within the switchgear, a network gateway 66, which provides network communication protocol, is included within the active filter section 20. Network gateways allow communications for all of the networked components to be transmitted through a single common shared network cable rather than a bundle of many dedicated communication cables. A network cable is run from the network gateway 66 up through the cable tray 62 and out to other components connected to the network. It may be desirable to run dedicated communications cables from components within other sections of the switchgear to the same network gateway device 66, or locate the network gateway 66 in another switchgear section and run a dedicated communication cable through the cable tray 62 and back to the active filter section 20.

Figure 5:
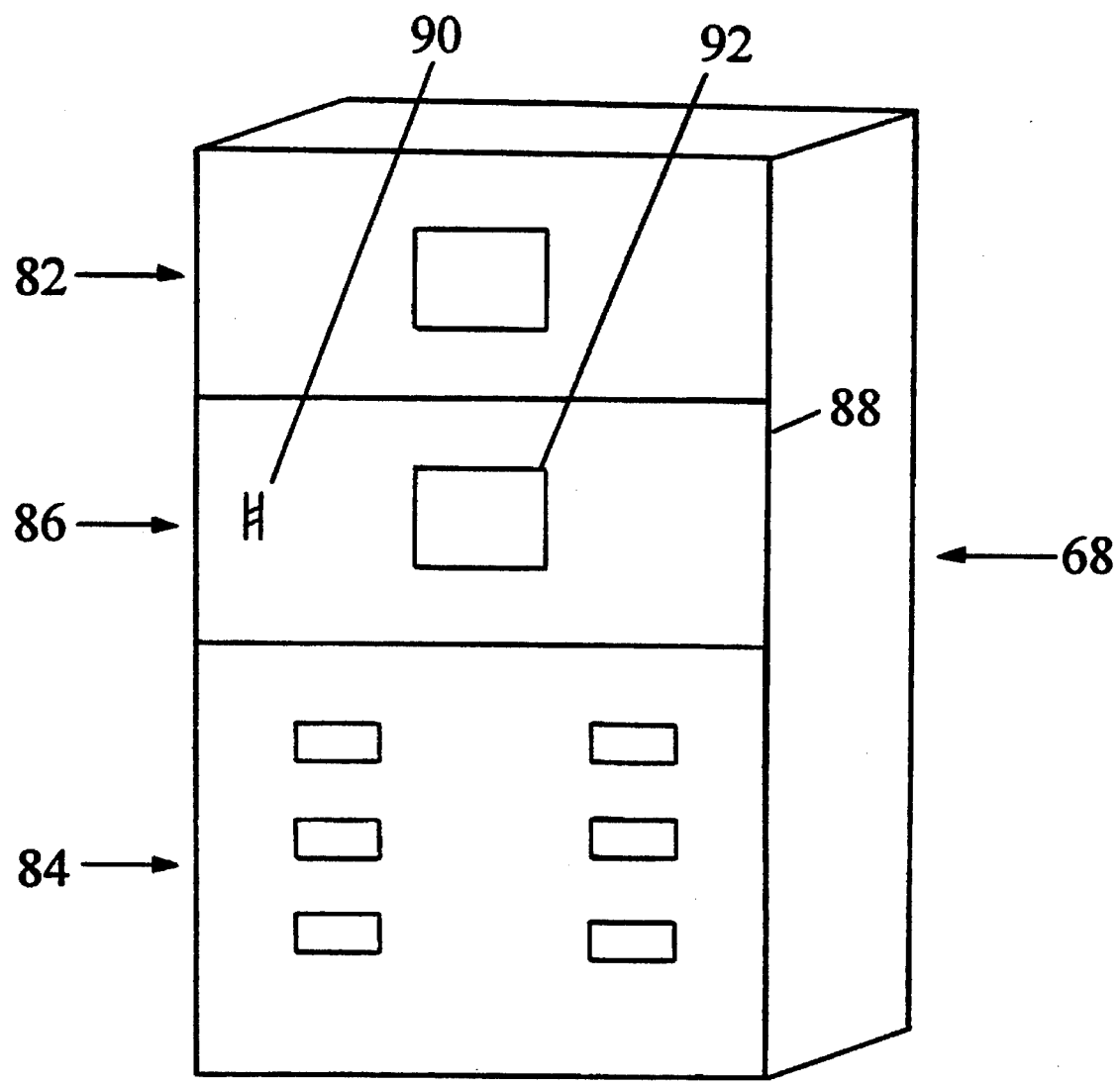
FIG. 5 is a diagrammatic perspective view of another preferred embodiment of a switchgear enclosure according to the present invention with an integrated active filter compartment.

Referring now to FIG. 5, showing switchgear of smaller size commonly referred to as panelboard or power panel or lighting panel or load center, a single enclosure 68 may be divided into three compartments. The first compartment 82 is located near the top of the enclosure and houses a main circuit breaker section. The second compartment 84 is positioned at a lower elevation than the first compartment 82 and houses the load circuit breaker section. The third compartment 86 is connected electrically between the first and second compartments 82, 84 and houses an active filter device. It is most advantageous to physically position the active filter compartment 86 between the first and second compartments 82, 84 as shown in FIG. 5. If sufficient space does not exist, an umbilical cord can be run a short distance to an adjacent active filter compartment 86. The umbilical cord contains all power, instrumentation, and communication cables between the active filter compartment 86 and the remaining switchgear. A front door 88 provides access to the enclosure at least in the area of the active filter compartment 86. The front door 88 is equipped with an interlock 90 that keeps the front door 88 closed until the interlock 90 is released by de-energizing the active filter protective device 92. The electrical sections housed in the three compartments 82, 84, 86 are electrically the same as the main circuit breaker section 18, active filter section 20 and load circuit breaker section 22 of the switchgear lineup 10 of FIGS. 1–4. The enclosure 68 and the electrical components are integrated into a switchgear lineup in much the same way as the active filter section 20 is integrated into switchgear lineup 10 with buses and cables. The difference is that the buses between the circuit breaker sections and active filter section run vertically instead of horizontally with attendant changes in the orientation of the risers. This orientation provides the best accommodations for smaller size components found in switchgear of lower power ratings. The enclosure 68 is connected by horizontal buses to the other sections of the switchgear. The hoist, if present, would ride on rails atop the enclosure 68 for lifting components within the circuit breaker and active filter sections. If desired, the rails can extend to adjacent sections of switchgear.

Operation of the present invention is believed to be apparent from the foregoing description, but a few words will be added for emphasis. The full advantage of active filter technology is realized by placing the active filter between the main circuit breaker and load circuit breaker sections. Thus, from a single location, power quality is improved for the aggregate of all loads connected to the switchgear and the upstream source. Although the active filter could provide this corrective function from other locations within the switchgear, power and control connections are shortest and simplest at this location. The active filter circuit protection has a short circuit interruption rating equal to the remainder of the switchgear lineup.

It can now be appreciated that there has been presented a switchgear lineup integrating an active filter. The present invention incorporates active filter technology as an integral part of power distribution switchgear equipment thereby enhancing power quality for the aggregate of all loads connected to the switchgear and the upstream source. The active filter provides power quality improvement in the form of harmonic current attenuation, harmonic voltage attenuation, load balancing, high speed power factor correction, and reduced magnitude voltage sags. The areas of power quality improvement achieved depend on the selection of active filter equipment; a series connected active filter element, a parallel connected active filter element or a combination of both may be used.

Integrated active filter technology in power distribution switchgear represents a simplified installation. The electrical and physical position of the active filter device facilitates the power quality benefits from a single active filter location. The addition of a rear bus compartment shortens and simplifies the power and instrumentation interconnections. The addition of a top cable tray also shortens and simplifies the instrumentation and communications interconnections. The integral design is more compact than connecting a stand alone active filter unit to the same electrical location.

The present invention provides several hardware simplifications. Where a stand alone filter usually requires its own incoming power protective device in addition to a protective device on the upstream feeder, the integral design of the present invention requires just one protective device. Where a stand alone active filter may include a dedicated network gateway, which provides its own network communication protocol, the present invention incorporates a network gateway into the active filter section which provides the network communication protocol used by other components within the switchgear. The integral active filter also uses one common set of surge suppressors to serve the active filter as well as switchgear protection against upstream and downstream power distribution line disturbances.

While the invention has been described with particular reference to the preferred embodiments, it will be understood by those skilled in the art that various changes may be made and equivalents may be substituted for elements of the preferred embodiments without departing from invention. For example, the front door interlock becomes operable upon de-energizing the circuit breaker, but the interlock could be linked to a fuse or switch.

As is evident from the foregoing description, certain aspects of the invention are not limited to the particular details of the examples illustrated, and it is therefore contemplated that other modifications and applications will occur to those skilled the art. For example, it is possible to position the buses so that risers are not needed. Main bus, risers and primaries can be combined into a single stamped part in low power switchgear equipment. It is accordingly intended that the claims shall cover all such modifications and applications as do not depart from the true spirit and scope of the invention.

I claim:

1. Electrical equipment for incorporation into a switchgear lineup, said switchgear lineup having a plurality of electrical sections including a main circuit breaker section and a load circuit breaker section spaced from said main circuit breaker section, said electrical equipment comprising:

an enclosure having top, front and rear portions and being positioned between said main circuit breaker section and a load circuit breaker section;

a dedicated active filter device positioned in said enclosure;

a dedicated protective device in said enclosure, capable of short circuit interruption ratings equal to the remainder of said switchgear lineup;

a front door providing access to said front portion of said enclosure; and an interlock for said front door, said from door remaining closed until said interlock is released;

said active filter including a first transform means for transforming a first set of signals, each signal thereof representing load current in a respective one of the main power distribution lines, into a second set of signals which includes active and reactive components of current in the main power distribution lines;

a filter means for receiving said active and reactive components for removing therefrom components at a fundamental frequency to provide harmonic active and reactive components: and a second transform means for receiving said harmonic active and reactive components and a signal reverse transform operation thereon so as to provide a set of harmonic command signals, said harmonic command signals being collectively disposed to drive said device to generate line harmonic and neutral unbalance compensating currents for application to corresponding main power lines of a three phase system.

2. An electrical equipment enclosure, as set forth in claim 1, wherein said interlock is an interlock latch.

3. An electrical equipment enclosure, as set forth in claim 1, wherein said active filter device includes a network gateway which provides a common network communication protocol used by components within the switchgear.

4. An electrical equipment enclosure, as set forth in claim 1, including a rear bus compartment in said rear portion of said enclosure behind said active filter device.

5. An electrical equipment enclosure, as set forth in claim 4, including:

a set of horizontal main phase buses;

a set of vertical bus risers connected to said set of horizontal main phase buses;

an incoming power cable having a conductor for each of said vertical bus risers; and a set of primary stabs connecting each conductor of said incoming power cable to a respective vertical bus riser.

6. An electrical equipment enclosure, as set forth in claim 5, including:

a neutral bus; and a set of current transformers positioned on said set of horizontal main phase buses and located between power cable connections to said active filter device through said vertical bus risers and downstream main phase bus locations to subsequent electrical sections of said switchgear lineup.

7. An electrical equipment enclosure, as set forth in claim 5, including:

a ground bus; and a set of surge suppressers connected to said horizontal main phase buses and said ground bus.

8. An electrical equipment enclosure, as set forth in claim 1, including:

a cable tray extending along said top portion of said enclosure between said main circuit breaker section and said load circuit breaker section;

a first set of instrumentation and communications cables in said cable tray linking an active filter section of said active filter device to other electrical sections of said switchgear lineup; and a second set of instrumentation and communications cables in said cable tray linking said active filter section of said active filter device to devices remote from said switchgear lineup.

9. An electrical equipment enclosure, as set forth in claim 1, including:

a cable tray extending along said top portion of enclosure between said main circuit breaker section and said load circuit breaker section;

a rail connected to said top portion of said enclosure above said cable tray; and a hoist riding on said rail.

10. An electrical equipment enclosure for housing switchgear, said switchgear having a plurality of electrical sections, said enclosure comprising:

a first compartment located near the top of said enclosure for housing a main circuit breaker;

a second compartment positioned at a lower elevation than said first compartment for housing load circuit breakers;

a third compartment electrically connected and preferably positioned between said first and second compartments;

a dedicated active filter device positioned in said third compartment;

a dedicated protective device in said third compartment, with short circuit interruption ratings equal to the remainder of said;

a front door providing access to said front portion of said third compartment; and an interlock for said front door, said front door remaining closed until said interlock is released;

said active filter comprising a first transform means for transforming a first set of signals, each signal thereof representing load current in a respective one of the main power distribution lines, into a second set of signals which includes active and reactive components of current in the main power distribution lines;

a filter means for receiving said active and reactive components for removing therefrom components at a fundamental frequency to provide harmonic active and reactive components; and a second transform means for receiving said harmonic active and reactive components and a signal reverse transform operation thereon so as to provide a set of harmonic command signals, said harmonic command signals being collectively disposed to drive said device to generate line harmonic and neutral unbalance compensating currents for application to corresponding main power lines a three phase system.

11. An electrical equipment enclosure, as set forth in claim 10, wherein said interlock is an interlock latch.

12. An electrical equipment enclosure, as set forth in claim 10, wherein said active filter device includes a network gateway which provides common network communication protocol used by other components within the switchgear.

13. An electrical equipment enclosure, as set forth in claim 10, including a rear bus compartment in said rear portion of said enclosure behind said active filter device.

14. An electrical equipment enclosure, as set forth in claim 13, including:

a set of main phase buses;

a set of bus risers connected to said set of main phase buses;

an incoming power cable having a conductor for each of said bus risers; and a set of primary stabs connecting each conductor of said incoming power cable to a respective bus riser.

15. An electrical equipment enclosure, as set forth in claim 14, including:

a neutral bus; and a set of current transformers positioned on said set of main phase buses and located between power cable connections to said active filter device through said bus risers and downstream main phase bus locations to subsequent electrical sections of said switchgear.

16. An electrical equipment enclosure, as set forth in claim 14, including:

a ground bus; and a set of surge suppressers connected to said main phase buses and said ground bus.

17. An electrical equipment enclosure, as set forth in claim 10, including:

a cable tray in said active filter device compartment extending between said first and second compartments;

a first set of instrumentation and communications cables in said cable tray linking an active filter section of said active filter device to other electrical sections of said switchgear; and a second set of instrumentation and communications cables in said cable tray linking an active filter section of said active filter device to devices remote from said switchgear.

* * * * *